(12) United States Patent
Li et al.

(10) Patent No.: US 10,120,671 B1
(45) Date of Patent: Nov. 6, 2018

(54) MULTI-LEVEL IMAGE EXTRACTION

(71) Applicant: INTERNATIONAL BUSINESS MACHINES CORPORATION, Armonk, NY (US)

(72) Inventors: Guo Qiang Li, Beijing (CN); Xiao Yuan Ma, Beijing (CN); Ping Xiao, Beijing (CN); Zhi Feng Zhao, Wuhan (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/671,337

(22) Filed: Aug. 8, 2017

(51) Int. Cl.
- *G06F 9/445* (2018.01)
- *G06F 8/61* (2018.01)
- *G06F 9/455* (2018.01)

(52) U.S. Cl.
CPC ............ *G06F 8/63* (2013.01); *G06F 9/45545* (2013.01)

(58) Field of Classification Search
None
See application file for complete search history.

(56) References Cited

U.S. PATENT DOCUMENTS

| | | | |
|---|---|---|---|
| 8,464,246 B2 | 6/2013 | Davies et al. | |
| 8,825,864 B2 | 9/2014 | Li et al. | |
| 9,003,397 B2 | 4/2015 | Li et al. | |
| 9,229,766 B2 | 1/2016 | Acheff et al. | |
| 9,235,402 B2 | 1/2016 | Carpenter et al. | |
| 9,426,030 B1 * | 8/2016 | Anerousis | H04L 41/0859 |
| 9,916,233 B1 * | 3/2018 | Qureshi | G06F 11/3692 |
| 2006/0174238 A1 * | 8/2006 | Henseler | G06F 8/63 717/168 |
| 2007/0169049 A1 * | 7/2007 | Gingell | G06F 8/61 717/151 |
| 2017/0255462 A1 * | 9/2017 | Azagury | G06F 8/76 |
| 2018/0129479 A1 * | 5/2018 | McPherson | G06F 8/20 |

* cited by examiner

*Primary Examiner* — Philip Wang
(74) *Attorney, Agent, or Firm* — Cantor Colburn LLP; William A. Kinnaman, Jr.

(57) ABSTRACT

A computer-implemented method includes saving a copy of a client computing environment to a computer memory on the host system. The processor writes an image of the client computing environment based on the saved copy of the client computing environment. The image includes an application layer, a middleware layer, and a system layer, and is based on the copy of the client computing environment. The image is extractable as a sub-image that includes one or more of the application layer, the middleware layer, and the system layer. The image includes a resource pattern having dependencies that associate two or more of the application layer, the middleware layer, and the system layer, such that the sub-image is combinable with an existing active container operating on a second computing system. The combination results in a functional copy of the client computing system with the changes extracted from the sub-image.

19 Claims, 11 Drawing Sheets

MULTI-LEVEL IMAGE EXTRACTION

BACKGROUND

The present disclosure relates to mainframe computer imaging, and more specifically, to dynamic multi-level imaging.

As the enterprise grows, computing requirements also may also grow, which often require quick development and deployment of applications, middleware, and/or operating systems installed on client computing systems. Client-side computing problems often originate from the installation of new applications, middleware, when client-side (e.g. enterprise) computing problems arise, it is the job of client facing service and development teams often tasked with bringing the client computing system back to a normal operating condition.

The information technology (IT) team of the mainframe computing platform is often responsible for fixing the client-side computing problem. The IT team is often tasked with determining the problem on the client system, developing a solution, validating the solution, and deploying a validated fix on the client platform that brings the client system back to operable condition. That technical team may be divided into various task groups that handle aspects of the resolution. For example, the teams are often divided into a development team and a service team. On the development side, the development team, after receiving a request to investigate and resolve client computing problems, will coordinate with a service (deployment) team to develop the solution to the client problem.

The work can be divided in various ways. For example, it may be the development team tasked with determining (identifying) what the technical problem is on the client computing platform, and developing a solution for the diagnosed problem. One step in diagnosing or determining the source of the issue is recreation of the exact computing environment on the client side, so that the source of the computing problem can be identified in a controlled environment. Once the client system is re-created from an image of the client's computing platform, the source of the problem is then identified, and a solution is developed. Once a solution is determined, the development team then forwards the fix to the service team, who then re-creates the client-side computing environment a second time to validate the solution. After validation, the solution the service team installs the client platform. Many of the system re-creation steps are often duplicated by various teams working on the solution.

SUMMARY

According to an embodiment of the present invention, a computer-implemented method for multi-level imaging and extraction on a host system is described. The method includes saving, via a processor, a copy of a client computing environment to a computer memory on the host system. The processor writes an image of the client computing environment based on the saved copy of the client computing environment. The image includes an application layer, a middleware layer, and a system layer, and is based on the copy of the client computing environment. The image is extractable as a sub-image that includes one or more of the application layer, the middleware layer, and the system layer. The image includes a resource pattern having dependencies that associate two or more of the application layer, the middleware layer, and the system layer, such that the sub-image is combinable with an existing active container operating on a second computing system. The combination results in a functional copy of the client computing system with the changes extracted from the sub-image.

According to other embodiments, a computer-implemented method for multi-level imaging and extraction on a guest system includes retrieving, via a processor, an image of a client computing environment. The image includes an application layer, a middleware layer, and a system layer. The processor assigns an extraction level needed to extract one or more sub-images from the image of the client computing environment so that the sub-image that can be incorporated with an active container on the guest system. To that end, the processor collects a plurality of resources associated with the assigned extraction level and defines a plurality of resource dependencies for the application layer, the middleware layer, and the system layer. The resource dependencies identify an operational relationship between the plurality of resources and one or more of the application layer, the middleware layer, and the system layer. The processor then generates an image and build file based on the extraction level and the plurality of dependencies, and extracts the one or more sub-images from the image of the client computing environment by executing the image and build file. By executing the image and build file the processor incorporates the one or more sub-images with the active container on the guest system.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
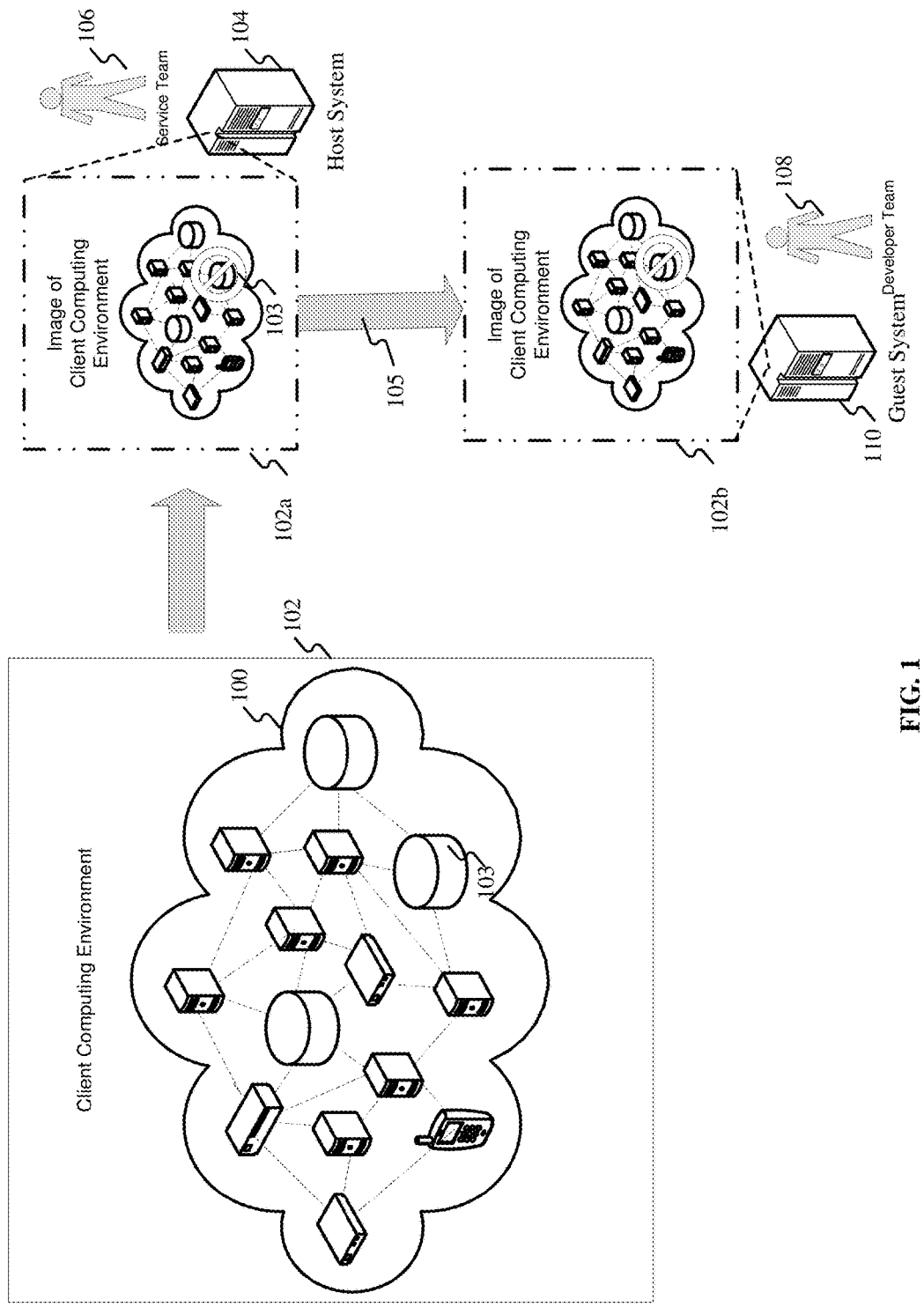
FIG. 1 depicts an image of a client-side computing environment, a host system, and a guest system.

FIG. 1 depicts an image of a client-side computing environment 100 (hereafter "computing environment 100" or "client environment 100"), a host system 104, and a guest system 110. Host system 104 is depicted having a copy of client computing environment 100 saved on a computer memory. The copy is considered a system image 102. As described herein, a system image is a serialized copy of a computer system or virtual computing environment at a particular state. For example, client computing environment (such as, for example, client computing environment 100). A computing environment may include virtual or real hardware, software, network configurations, etc. Image 102 is a copy or image of client environment 100 at a particular state. Image 102 includes a description file or group of files that are used by an image extraction program to build and generate the computing system described by instructions in the image 102. The image can be stored on a non-volatile computer memory (e.g., a computer memory in the host system 104. A system is said to be capable of using images if it can be shut down and later be restored to the exact state desired using the stored image at a point in time of normal functionality.

Image 102 can be used as a system backup or a restore point for restoring the client computing environment 100 to a condition at a particular period of time. System images can also be used to recreate a virtual computing environment for troubleshooting or system development, among other uses. For example, in some instances, the image can be used to re-create a virtual instance of client computing environment 100, within host system 104, to determine a source of system instability on the client side caused by modifying, adding or removing system software, middleware, or batch processing regions such as a Customer Information Control System (CICS). As shown in FIG. 1, computing environment 100 is depicted having CICS 103, as an exemplary resource that was changed in some way. By way of example, by changing the resource 103 (CICS 103), client environment 100 may have experienced some instability or malfunction that requires diagnosis and remedy by a user (service team 106). Service team 106 may save image 102 on host system 104 to evaluate the technical issue, and develop a solution to fix the problem.

The re-creation of client environment 100 on host system 104 for diagnosing problems can be time-consuming and resource intense because of the volume of data that may be necessary to construct the image. A second team (developer team 108) may be simultaneously developing a portion of the solution or may be tasked with testing a solution developed by service team 106. Thus, developer 108 must copy image 102 from the host system 104 and transfer image 102 to the guest system 110 on which the test developer 108 will develop a solution, perform testing, etc. Current imaging utilities generally copy the entire image 102 of the client environment 100 to their own computing platform, and various technical teams working on different aspects of the client problem may have to duplicate the image platform (i.e., restore the image) on their respective platforms to create the client environment again. This process may be duplicated at various stages of the troubleshooting and solution development.

When multiple teams (e.g., service team 106 and developer team 108) are working on a solution using image 102 of the client system, they may each have copies of image 102 on their own respective systems 104 and 110, to perform work or testing on aspects of the solution either serially or simultaneously with respect to one another. When the work is performed serially, where one group (e.g., service team 106) creates some change or fix to the image 102a (depicted in FIG. 1 as removing resource 103 (CICS 103) and performing various system revisions), service team 106 sends the entire changed image 102a to another group (e.g., developer team 108) to validate and install the fixed image. The second team in the process must re-install the entire image (shown as 102b) to their platform instead of just the changed "fixed" portion 103 (e.g., CICS 103). This problem exists because current imaging technologies do not have a way to differentiate between the portions of the CISC 103 that need to be copied to guest system 110, based on what has changed, while keeping dependencies of changed CICS 103 intact after the transfer. For example, guest system 110 (the test team's system) receives an update package 105 from host system 104 (the development team's system) and guest system 110 must then re-load the entire environment of image 102b to keep the dependencies intact instead of simply loading the changed portion of the image (e.g., CICS 103).

This limitation exists because dependencies between software applications, application data, application context data, and the associated system resources (which are all stored on the revised image 102b) are not indexed, characterized, and transferred along with the changed portion (CICS) 103. Absent a usable map that that identifies elements of the client environment 100 mapped to the corresponding and dependent elements of the guest system 110 (and more particularly, to an active container operating on the guest system 110) that are affected by changed portion (CICS) 103, any individual image portions (or sub-images) of image 102 containing only the changes become unstable or unusable on guest system 110 when installed independent of the whole image 102a. The usable map would need to identify dependencies in general, and more particularly, dependencies at a point in time in view of one or more containers that were active at the time of the image. Because containers are active and inactive dynamically with respect to time, current systems do not have a way to create and forward the map as it is changed by system revisions (CICS 103) on the image 102

Application containerization (or container-based virtualization) is a distributed application deployment model in cloud computing and cognitive computing environments that offer an alternative to launching a virtual machine for each application. Isolated environments, called containers, instead run on a single control host and share the same operating system kernel. Compared to traditional virtualization, containerization allows for greater efficiency for memory, CPU, and storage. Because containers share the same OS kernel as the host, containers can be more efficient than virtual machines (VMs), which require separate instances of operating systems. Containers hold the components necessary to run the desired software, such as files, environment variables, and libraries. The host operating system also constrains the container's access to physical resources—such as CPU and memory—so a single container cannot consume all of a host's physical resources. Containers can be created on a virtual or distributed computing system and remain static, or they may be in active use by the guest system 110. The container's access to physical resources is recorded and maintained in the system registry of the system running the resource. When a container is active, the dynamically changing dependency relationships are not currently matchable with portions of an entire system image (e.g., image 102) because those dependency relationships that are active no longer match the dependency relationships in the image (which were a 'snapshot' of the client's system at a particular point in time).

As a solution to the technical problems described above, instead of transferring and restoring an entire image 102 from host system 104 to guest system 110, it may be advantageous to have a machine (e.g., one or more of host system 104 and guest system 110) perform the complex work of determining the resources required to apply and configure a pre-defined portion of image 102 to an active copy of the clients container (i.e., the CICS) on guest system 110, which may have the same system layer, middleware layer, and/or application layer, or any combination as image 102.

By way of a brief overview of embodiments described herein, a system processor can define existing resources in an active container in the service team's computing platform (i.e., the host system). According to some embodiments, a user (e.g. part of a service team 106) can trigger host system 104 to create an extraction package having the entire image of the client's computing environment 100 organized into sub-level images of the main system image (i.e., sub-portions of the image in its entirety). The host system 104 creates an extraction package is forwardable to another developer (e.g., developer 108) working on another aspect of the project on a guest system 110. The extraction package is executable using a single command on guest system 110 that activates the guest system to dynamically and adaptively apply one or more sub-level images to an existing active container on the host.

On the guest side 110, the processing system on a guest system 110 then defines dependencies for each of the resources in the guest system active container by creating an extraction tool that creates a sub-image based on multiple logical sub-levels of extraction scope. The processor defines the sub-levels and extraction scope according to a different business or environment requirements of the guest system 110 in view of the active container operating in the service team's computing environment. The extraction scope defines the portion(s) of the host system 104 to map and extract, instead of extracting the entire image of the host system, with its data, and copying all of the extracted information in whole). The guest system processor then incorporates traces, program association data, and application context data into the extraction package.

Embodiments of the present invention prevent unnecessary duplication work by preventing restoration of unnecessary image portions by different teams working on a client's image, which saves valuable computing resources and time by extracting only the necessary sub-image(s) according to a system-created dependency table that references a template, traces, program association data, and application context data identified in the image.

Figure 2:
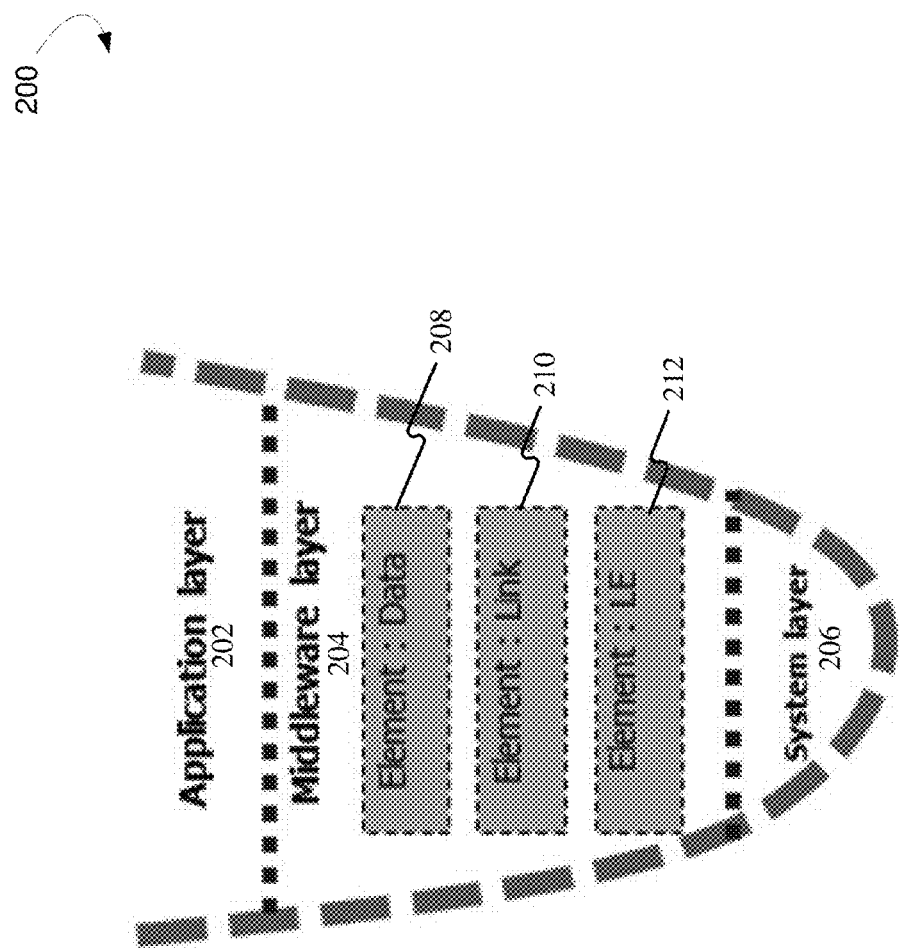
FIG. 2 depicts an image of a client-side computing platform according to one embodiment.
Figure 11:
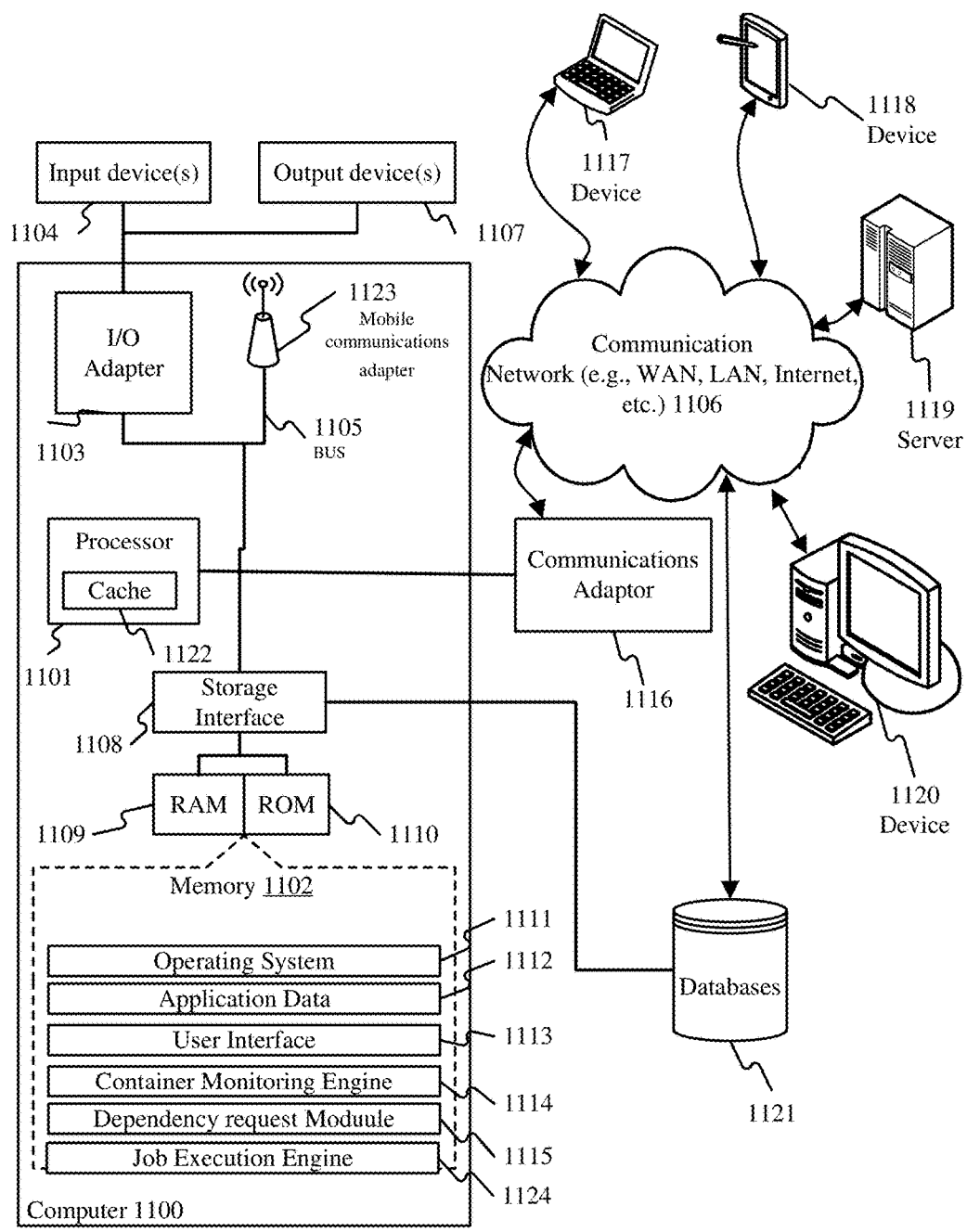
FIG. 11 depicts a block diagram of a computer system and environment, according to one embodiment.

Now considering embodiments of the present invention in greater detail, FIG. 2 depicts an image 200 of a client-side computing environment 100, according to one or more embodiments. Image 200 of the client-side computing environment is organized by a system processor to include a particular relationship between elements of the client's system. As shown in FIG. 2, a system processor (e.g., processor 1101 as shown in FIG. 11) organizes (writes) image 102 by dividing client computing environment 100 into three logical layers that include an application layer 202, a middleware layer 204, and a system layer 206.

In some aspects, application layer 202 includes user applications operating on the client system, and the client system definitions and runtime statuses at the moment of image creation. In that sense, image 200 is a "snapshot" of the client system at a particular point in time. Application layer 202 may include traditional COBOL programs, web services, transactions, etc.

Middleware layer 204 can include elements from the client system such as application data 208, link element data 210, and Language Environment (LE) data 212. System layer 206 also includes the base container, such as CICS. For example, data element 208 can include data used by active or non-active applications (working files, etc.). Link elements 210 can include connection link information such as Transmission Control Protocol/Internet Protocol (TCP/IP) services, and Internet Protocol Interconnectivity (IPIC) service connections, among others. Link elements 210 includes information used by the system to connect the system to other computing platforms. Language Environment (LE) elements 212 includes language environment information used by the host system. For example, LE elements 212 can include information such as Java/Liberty configurations, etc. Data elements 208, link elements 210, and LE elements 212 are stored in the registry of the host system.

Figure 3:
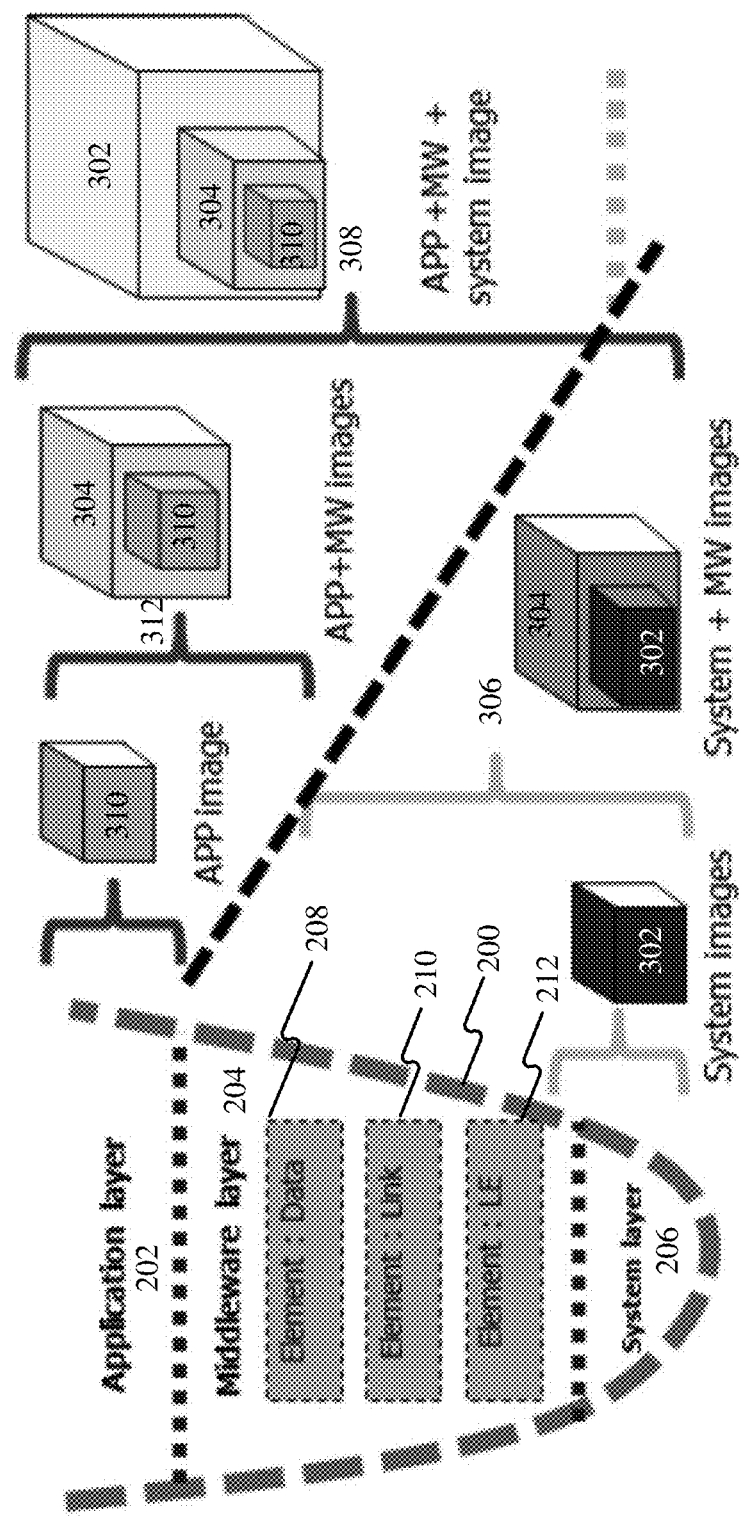
FIG. 3 depicts a plurality of image extractions sub-levels that are extractable from the image of FIG. 2 according to one embodiment.

FIG. 3 depicts a plurality of image extractions sub-levels that are extractable from the image of FIG. 2, according to one or more embodiments. Considering FIG. 3 in conjunction with FIGS. 1 and 2, image 200 includes the entire host system image 102 as organized into the three logical layers that include an application layer 202, a middleware layer 204, and a system layer 206. According to one embodiment, guest system 110 is configured to extract sub-images (referred to herein as extraction levels) from image 200 according to system-identified changes in the host system 104. Those skilled in the art appreciate that system images can be fully restored, where an entire image of a functional computing environment is restored from computer-readable media to a computing system. A full restoration includes all of the elements in system layer 206, all of the elements in middleware layer 204, and all of the elements in application layer 202. It should be noted, however, that conventional systems may restore all of the elements as described to re-create client computing environment 100, the image is not logically organized as shown in image 200, but rather an unorganized copy of the client computing environment (e.g., image 102).

According to embodiments of the present invention, guest system 110 can selectively deploy image 200 either from the bottom-up for static provisioning (where an active customer environment/active container is not currently saved on the system, and there is no need for a CICS container on the guest system 110), or from the top-down with dynamic provisioning (where a CICS container is needed on guest system 110, and is actively running).

In one embodiment depicted in FIG. 3, guest system 110 may retrieve an image 200 of client computing environment 100, where the image includes an application layer 202, middleware layer 204, and system layer 206. Guest system 110 then selectively performs a bottom-up deployment by extracting one or more of system layer 206, middleware layer 204, and/or application layer 202 from system image 200, starting first with system layer 206. Accordingly, after retrieving image 200, guest system 110 may execute a single command received from a user identifying the desired level of extraction, and assign one or more of the sub-images from image 200.

Responsive to receipt and execution of the single command, guest system 110 extracts application layer 206 by itself as a sub-image, depicted as system images 302 (also referred to as "system image 302"). This is considered a level-1 extraction.

In another aspect, responsive to a single command, guest system 110 is configured to extract a sub-image 306 containing sub-image 304 (also referred to as "System+middleware sub-image 304") and sub-image 302 (also referred to as a "system image" or an "APP image"). This is considered a level-2 extraction. Accordingly, sub-image 306 includes only system layer 206 and middleware layer 204 as contained in sub-images 302 and 304, respectively. Sub-image 302 can be extracted independently with a level-1 extraction command, or can be extracted in conjunction with sub-image 304 with a level-2 extraction command.

In yet another aspect, responsive to a single command, guest system 110 can extract a sub-image 308 containing sub-image 304 and application layer 202. This is considered a level-3 extraction. Accordingly, sub-image 308 includes all of system layer 206, middleware layer 204, and application layer 202.

Guest system 110 may also be configured to incorporate one or more sub-images from image 200 in a top-down approach. In this embodiment, dynamic provisioning allows for the incorporation of one or more sub-images with an active container in guest system 110. According to one embodiment, system 110, responsive to a single command, can extract a sub-image 310 (also referred to as "APP image 310") containing only an application layer 202. This is considered a level-1 top-down extraction.

APP image 310 may include application information, a logical storage location of the applications, program names, definitions of the program, etc. APP image 302 can also include one or more commands that contain the active resource, and the method of deploying those resources associated with the applications identified in application layer 202. One such example is a docker utility (a general utility for application provisioning).

In another embodiment, system 110 extracts sub-image 312, which includes sub-image 310 and sub-image 304. This is considered a level-2 top-down extraction.

In yet another embodiment, guest system 110 is configured to extract sub-image 308, which contains all of sub-image 302, 304, and 310. This is considered a level-3 top-down extraction.

Figure 4:
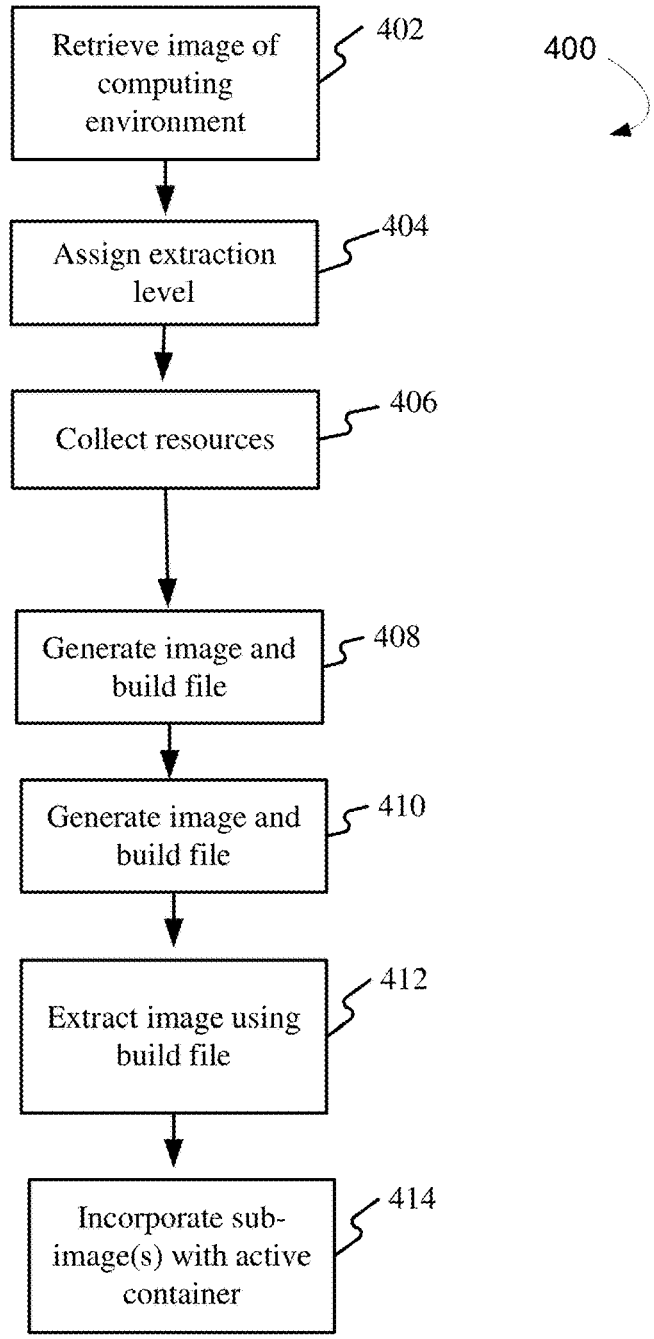
FIG. 4 depicts a method for multi-level image extraction according to one or more embodiments.

FIG. 4 depicts a method 400 for multi-level image extraction, according to embodiments of the present invention. All top-down extractions include definitions of resource dependencies that identify operational relationships between resources extracted from image 200. As shown in FIG. 4, at block 402 guest system 110 retrieves an image 200 of a client computing environment 100. Image 200 includes application layer 202, middleware layer 204, and system layer 206.

As shown in block 404, system 110 assigns an extraction level needed to extract one or more of the sub-images from image 200. The sub-image(s) can be selectively incorporated by system 110 into an active container on guest system 110 in a top-down extraction, or be incorporated into system 110 in a bottom-up extraction where a container is not needed. Accordingly, system 110 assigns the extraction level based on an observed condition of one or more active containers operating on guest system 110. A container monitoring engine is configured to run continuously on guest system 110. The container monitoring engine 1114 (shown on FIG. 11) is configured to identify any active containers on system 110 that could be affected by image 200. To determine whether there would be an effect of a change to an active container on guest system 110, container monitoring engine 1114 identifies the change from host system 104 to image 102. If there are only application changes on the host system 104, then application extraction is enough (a level-1 top-down extraction having only APP image 310 (FIG. 3), and thus, guest system 110 assigns a level-1 extraction. If there are application changes and middleware changes, container monitoring engine 1114 determines that it will need to extract the both application layer 202 and middleware layer 204 (e.g., sub-image 312) as a level-2 top-down extraction.

According to one embodiment, system 110 identifies application layer 202 and/or middleware layer 204 changes in image 200. The changes identified in image 200 are considered a change status. The change status indicates whether any one or more of application layer 202, middleware layer 204, and/or system layer 206 was changed by host system 104 respective to the corresponding layers on guest system 110. System 110 may also set a container instance name and a container instance time period associated with the needed extraction level.

In another embodiment, if system 110 determines that the middleware change is insignificant or otherwise unneeded, system 110 extracts application layer 202 only with a level-1 top down extraction and determines the dependencies associated with the application layer changes.

Accordingly, the user may select an option output by system 110 indicative of allowing the system to calculate required resources automatically and select an extraction level based on the required resources. The dependencies associated with the application layer changes may include a variety of system resources such as, for example, local or remote files, web services, web pages, executable programs, etc.

An extraction level is then assigned by system 110 based on the identified changes, and a confirmation message is output by the system for a user to confirm the system-determined extraction level needed to accommodate the changes in image 200 on system 110. Responsive to receiving a user confirmation, system 110 creates an extraction tool in the following steps and assigns the confirmed extraction level to the extraction tool.

At block 406, system 110 collects various resources associated with the assigned extraction level from step 404. Resource collection begins after the receiving the single-line command from the user (developer team 108). Container monitoring engine 1114 determines whether an application has been invoked during a pre-determined time period. For example, container monitoring engine 1114 may determine that two resources "transaction BANK" and "Web Service QERY" have been a been accessed. sorted out, and then these two resources are sent out to the dependency request module 1115 for calculating resource dependencies. You will get a dependency resource list which will be included in the extract list.

In one embodiment, system 110 includes a dependency request module 1115 (FIG. 11) configured to receive the resource collection output, and filter the resource list using a pattern decision tree. Those skilled in the art appreciate that a pattern decision tree is a known data mining algorithm used in determining classifications and predictions of unfiltered data to determine associations and probabilities of associations. In one embodiment, system 110 will obtain a dependency table template from a resource pattern depository. The resource pattern depository may be an online resource shared by multiple systems.

The dependency table template is preserved for different resources. For example, a transaction resource may need some necessary resource like a particular program, and some optional resource such as a file. The transaction resource may need one or more other programs linked for proper functionality. In some aspects, system 110 will instantiate the dependency template into a dependence table by checking the real (observed) dependency from runtime.

To instantiate the dependence table, system 110 obtains the required part of the template and finds the specific definition associated with that part of the template. Finding the specific definition includes determining an application context and determining association data. In one aspect, system 110 determines this information by a system command identifying the application context and association data. In another aspect, system 110 searches for this association iteratively by trying application context first, if there are no data, then trying the association data for a second time, then system 110 searches the Interdependency Analyzer (IA). AI is used to analyze the resources dependencies. Next searching the trace and log analysis, until the system finds the required part of the dependency. In another aspect, the optional part could be found once the required part been found, or it will lead to a lack-dependency mark in the generated configuration file. Accordingly, system updates the configuration file, and writes the updated file to the extraction tool.

As shown in block 408, system 110 defines one or more resource dependencies for a corresponding one of the application layer 202, middleware layer 204, and/or system layer 206. The resources are defined according to the extraction level assigned by system 110 at block 404. Once the dependency table is instantiated at step 406, system 110 uses a system resource repository (such as, for example, CICS, or a CICS system definition (CSD) dataset file) that stores the system resources. steplib of start task) and system catalogs to obtain the definitions and status for the dependencies. System 110 then writes the dependency table, system catalogs, and dependency statuses into an extract list, which will be used for the subsequent build process.

System 110 next generates an image and build file based on the extraction level and the plurality of dependencies, as shown in block 410. Accordingly, after system 110 has written the extract list, system 110 obtains the assigned sub-images (e.g., one or more of 302, 306, 308, 310, and/or 312, and instantiates a workflow generator to create a serial of scripts including JCLs, Rexxs, restful command scripts. System 110 next builds the script sets into a sub-image as part of the extraction tool.

Finally, system 110 analysis the sub-images and executes the new generated patch of scripts to create the new on-demand computing environment. System 110 extracts the image using the completed extraction tool (the build file), as shown in block 412. The image could be run by a job execution engine 1124 (FIG. 11), the engine will check the dependency table for the extracted list, and if they are lack of the dependencies, it will first check the guest system if it contains the dependency, if not, load them automatically from common resource repository (which maintains a serials of common middleware element, like zOSconnect configuration, or Liberty provision) to build a new list and import them into the execute list, if existing duplicate element, an overwrite mechanism will be used by default (and also could be customized).

As shown in block 414, system 110 incorporates the extracted sub-image(s) with the active container on the guest system. The execution engine will apply the image adaptively and dynamically, as there are three possibilities for the apply process, the image lack dependencies in the guest system, the image contains duplicate element for the dependencies in the guest system and perfect fit for the guest system.

Figure 5:
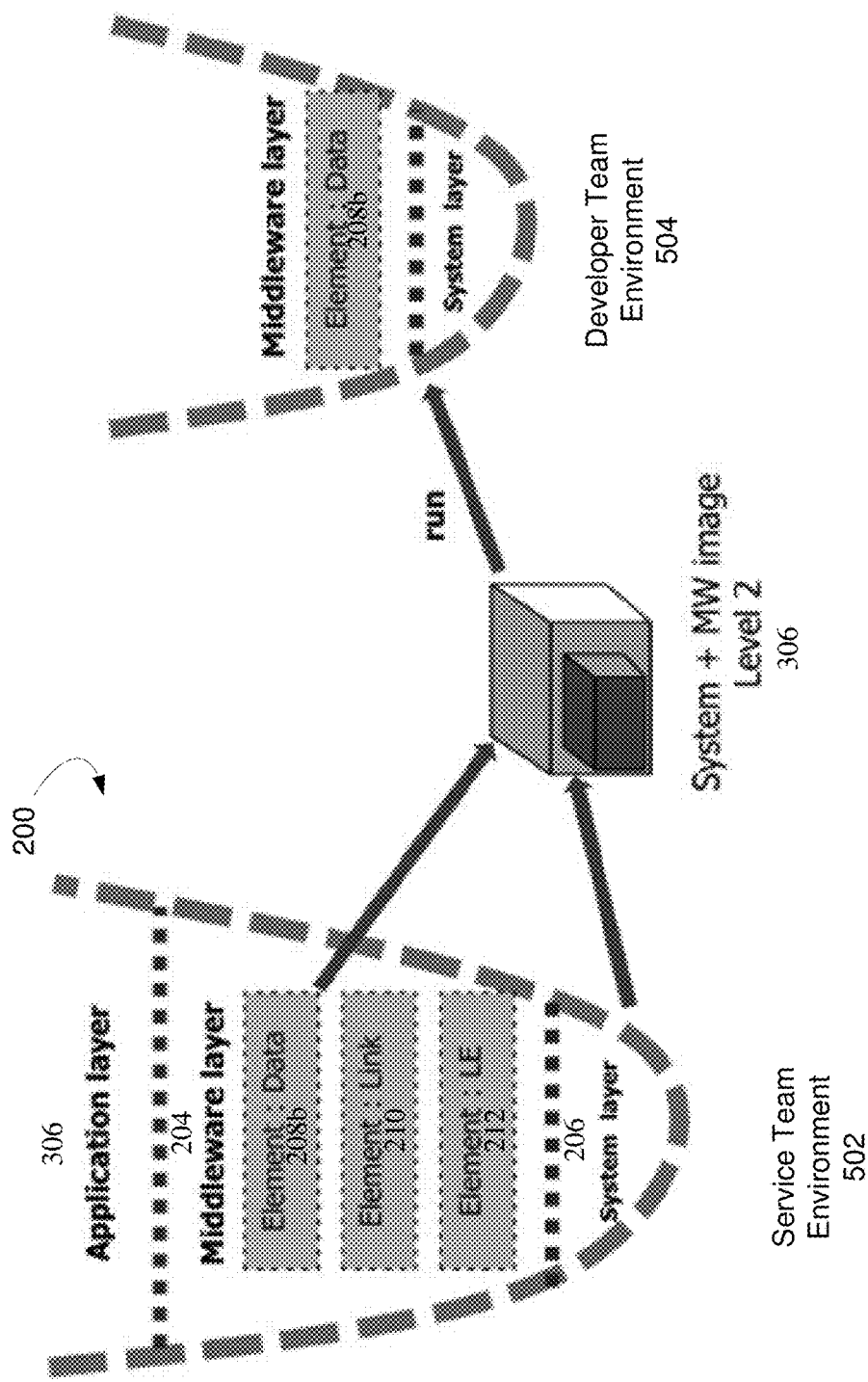
FIG. 5 depicts a bottom-up image extraction according to one embodiment.

FIG. 5 depicts one exemplary embodiment where system 110 deploys a bottom-up extraction to guest system 110. As shown in FIG. 5, a service team environment 502 has developed a solution to a customer problem and made a change to image 202 that affects data element 208 (now shown as 208b). In this scenario, system 110 executed a level 2 bottom-up mode to extract a sub-image 306, which contains system layer 206 and middleware layer 204 with changed data element 208b. With this generated level-2 image 306, guest system 110 deploys the image by a single-line command issued by a user on system 110. An example of a single-line command may be, for example, "cicspt run image_ level_2."

The container instance having only system layer 206 and middleware layer 204 is instantiated on guest system 110. The container deployed on guest system 110 (in developer team environment 504) now has the exact same container as the service team environment 502, which did not require unpacking and installation of the entire image 200. This scenario can be used for provisioning a basic identical container, like problem diagnosis for service team. In other aspects, a development team can use an identical container to troubleshoot a customer problem without requiring the reproduction of the entire computing environment.

Figure 6:
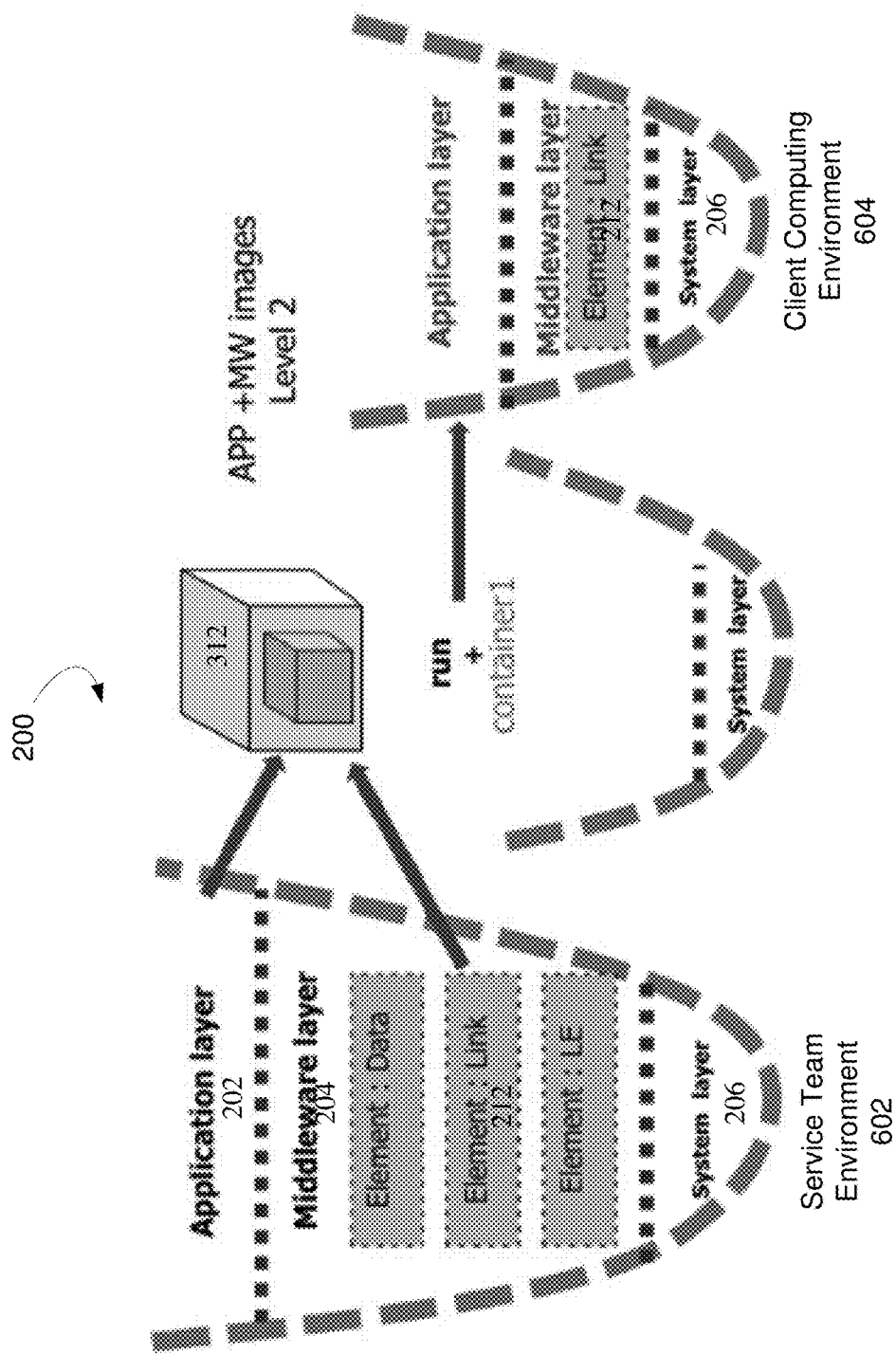
FIG. 6 depicts a top-down extraction of an image according to one embodiment.

FIG. 6 depicts a top-down extraction of image 200, in another operational example. In this scenario, two computing environments are shown: service team environment 602 and client computing environment 604. This scenario is often used for provisioning the upper layers while both of host environment 602 and client environment 604 both currently have the same base layer (system layer 206) installed on their respective systems. In this example, the developer team has made some change in the application layer, and the service team needs to deploy the change in the client computing environment. Prior to deployment, the developer team must first take a top-down extraction and apply it in the test system.

As shown in FIG. 6, system 110 a top-down level-2 extraction mode is deployed to extract an image 200, which contains application layer 202, and middleware layer 204 with language environment (LE) element 212. With this generated Level-2 image, the guest system deploys the sub-image 312 with a single-line command. The command may be, for example, "cicspt run image_level_2-C container1." The guest system now has the same application and link element applied in their system.

Figure 7:
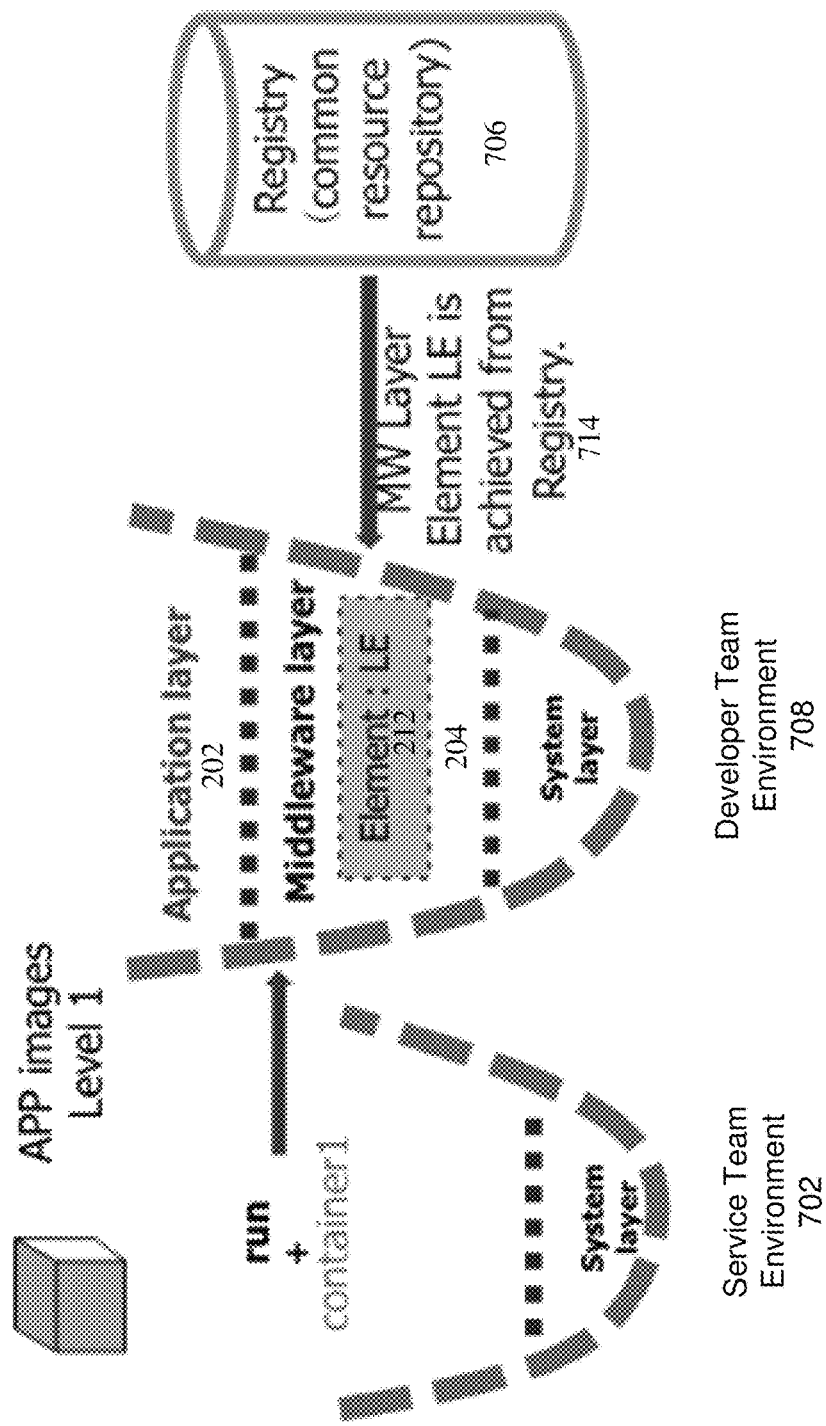
FIG. 7 depicts another top-down extraction of an image according to one embodiment.

FIG. 7 depicts another example of a top-down extraction of image 200, according to one embodiment. In the example of FIG. 7, upper layers 312 are provisioned (dynamically) while both of the systems in the service team environment 702 and developer system 708 (also referred to as a "developer team environment" or the "guest system") have the same base layer. In this example, both service team system 702 and guest team system 708 may access a common registry 706. Common registry 706 is a resource repository located at a centrally-accessible location (e.g., an online resource). As an example, the service team 702 may have applied modification to the application layer during their test, they just need take a top-down extraction and apply it in the developer system 708 for verification.

In this scenario, a top-down level-1 image mode is used to extract an image, which only contains application layer. With this generated level-1 image, developer's system 708 applies it in an existing guest system container by the issuance of a single-line command such as, for example, "cicspt run image_level_1-C container1.

The developer's system 708 will calculate the dependency first based on the dependency table, and find that the middleware layer language environment (LE element 212) is missing. Accordingly, developer's system 708 will retrieve the common middleware layer with LE element 714 from registry 706 and apply it in that system 708. Now, the same application and LE element middleware layer 710 has been applied in the guest system (e.g., developer system 708).

Figure 8:
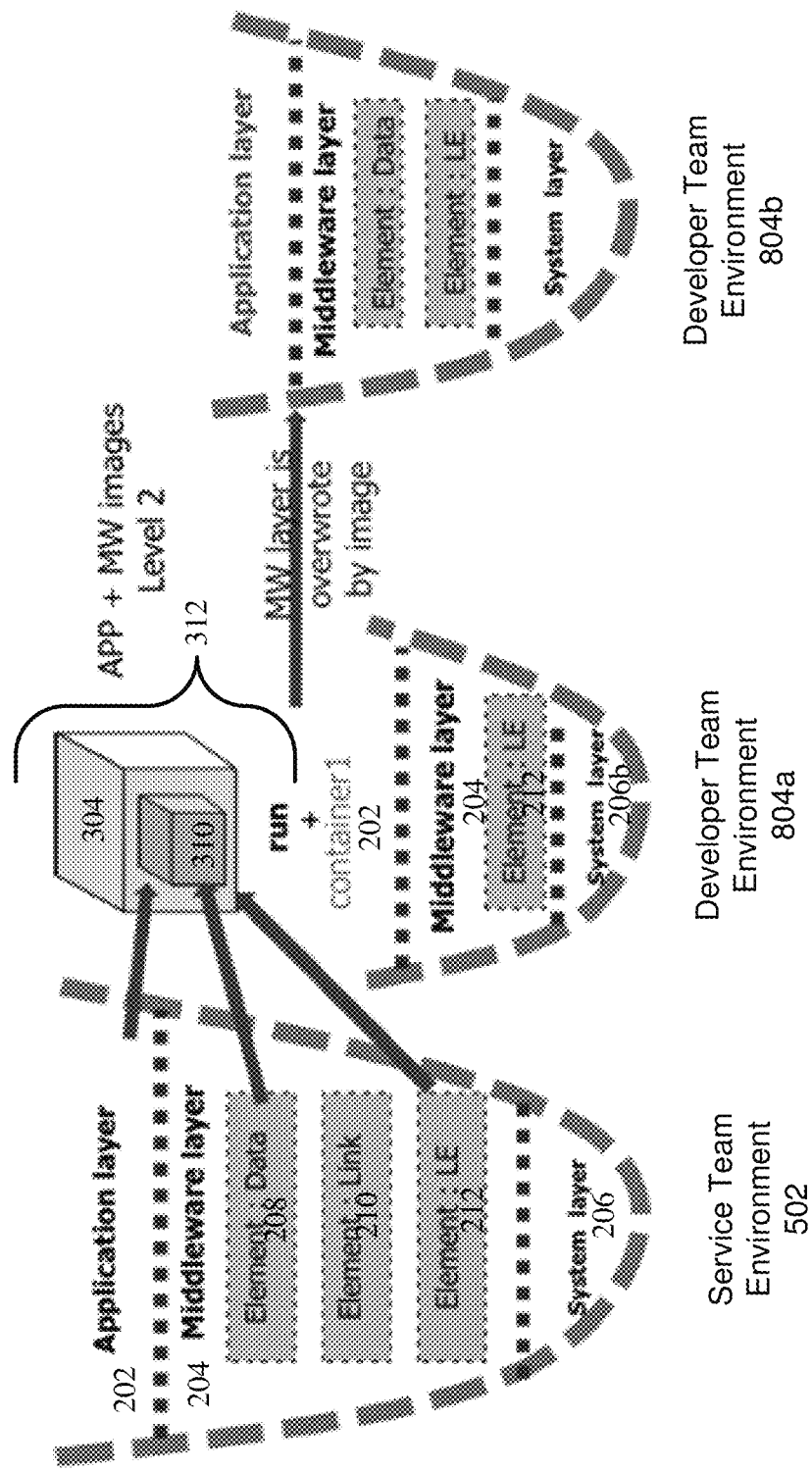
FIG. 8 depicts yet another top-down extraction of an image according to one embodiment.

FIG. 8 depicts another example of a top-down extraction. Referring now to FIG. 8, in this scenario, a top-down mode is used to extract an image 312, which contains application layer 202 and middleware layer 204, with LE element 212 and data element 208. With this generated level-2 image 312, developer system 804 applies it in an existing guest system/container. For example, developer team 804*a* has a container with the same system layer and middleware layer LE element installed. A single-line command is issued, "cicspt run image_level_2-C container1."

In developer system 804, cicspt calculates the dependency and finds the image also provides the LE element in middleware layer. Then in the guest system, element LE is overwritten and you will get the same application layer and link 10 LE element applied in the system. This scenario can be used for provisioning the upper layers while both of host and guest system have the same base layer.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least four service models, and at least four deployment models.

Characteristics of a Cloud Model

On-demand self-service: a cloud consumer can unilaterally provision computing capabilities, such as server time and network storage, as needed automatically without requiring human interaction with the service's provider.

Broad network access: capabilities are available over a network (e.g., network 1106, as depicted in FIG. 11) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 1106, as depicted in FIG. 11), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 1106, as depicted in FIG. 11), servers, operating systems, or storage, but has control over the deployed applications and possibly application hosting environment configurations.

Infrastructure as a Service (IaaS): the capability provided to the consumer is to provision processing, storage, networks (e.g., network 1106, as depicted in FIG. 11), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems can include monitoring engines to track performance and usage, error monitoring, and data analysis engines.

Deployment Models

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 9:
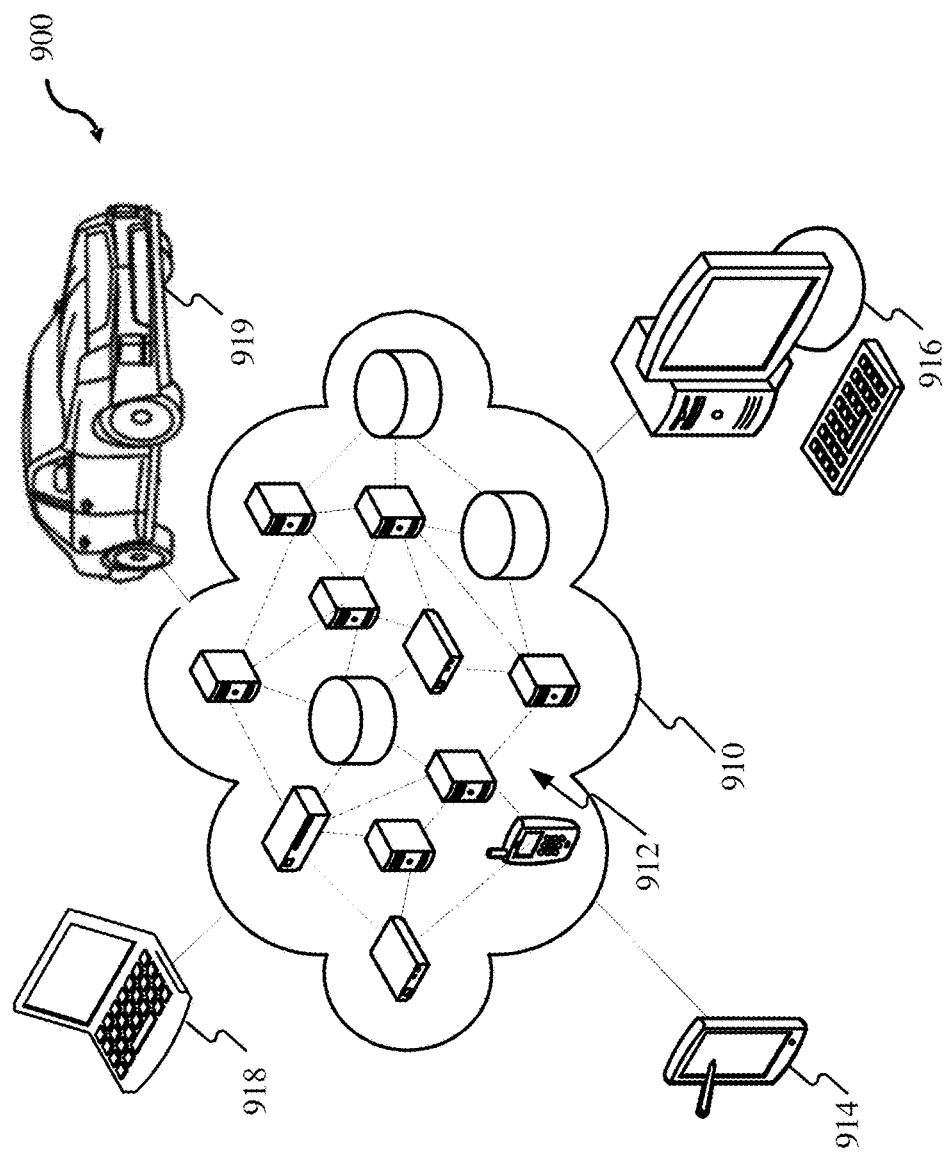
FIG. 9 depicts a cloud computing environment, according to one embodiment.

Referring now to FIG. 9, a cloud computing environment 900 for use in practicing the teachings herein is depicted. As shown in FIG. 9, cloud computing environment 900 comprises one or more cloud computing nodes 912 with which local computing devices used by cloud consumers, such as, for example, a mobile device 914, a desktop computer 916, a laptop computer 918, and/or an automobile computer system 919 can communicate. Cloud computing nodes 912 can communicate with one another. They can be grouped (not shown) physically or virtually, in one or more networks 910, such as a Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 914-919 shown in FIG. 9 are intended to be illustrative only and that cloud computing nodes 912 and cloud computing environment 900 can communicate with any type of computerized device over any type of network and/or network addressable connection (e.g., using a web browser).

Figure 10:
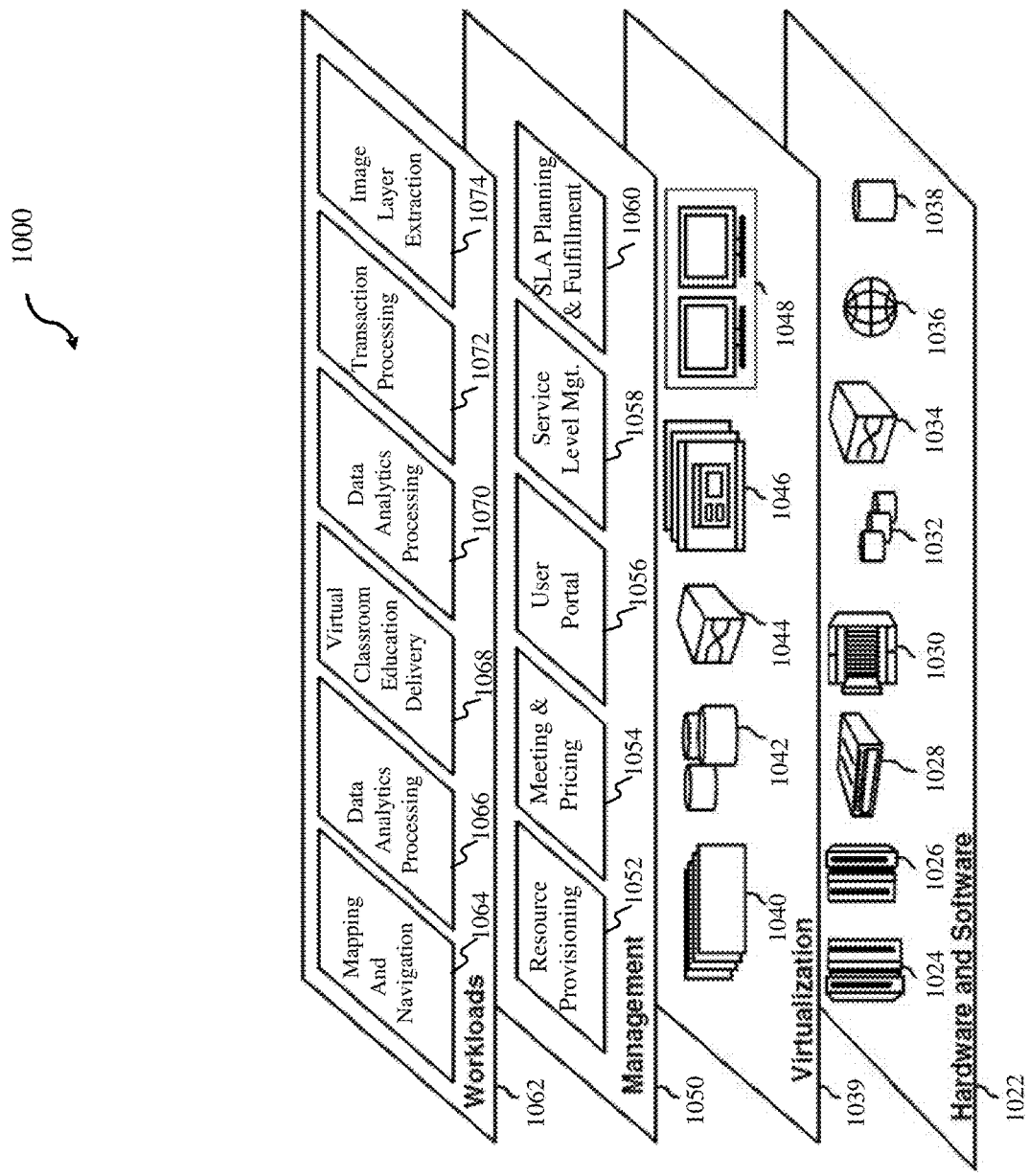
FIG. 10 depicts abstraction model layers, according to one embodiment.

Referring now to FIG. 10, a set of functional abstraction layers 1020 provided by cloud computing environment 10 (as depicted in FIG. 9) is shown. It should be appreciated that the components, layers, and functions of functional abstraction layers depicted in FIG. 10 are illustrative only, and embodiments of the invention are not limited thereto. As depicted, the following layers and corresponding functions are provided:

A hardware and software layer 1022 can include hardware and software components. Examples of hardware components can include, for example, mainframes 1024, 10RISC (Reduced Instruction Set Computer) architecture based servers 1026, servers 1028, blade servers 1030, storage devices 1032, and networks and networking components 1034. In some embodiments, software components include network application server software 1036 and database software 1038.

A virtualization layer 1039 can provide an abstraction layer from which the following examples of virtual entities can be provided: virtual servers 1040, virtual storage 1042, virtual networks 1044, which can include virtual private networks, virtual applications and operating systems 1046, and virtual clients 1048.

In one example, a management layer 1050 can provide the functions described below. A resource provisioning module 1052 can provide dynamic procurement of computing resources and other resources that can be utilized to perform tasks within the cloud computing environment. A metering and pricing resource 1054 can provide cost tracking as resources are utilized within the cloud computing environment, and billing or invoicing for consumption of these resources. In one example, metering and pricing resources can include application software licenses. A user portal 1056 can provide access to cloud computing environment 900 for consumers and system administrators (not shown). In some embodiments, user portal 1056 can provide security and/or identity verification for cloud consumers (e.g., one or more consumers operating one or more of computing devices 914-919) and tasks, as well as protection for data and other resources. A service level management resource 1058 can provide cloud computing resource allocation and management such that required service levels are met. A service level agreement (SLA) planning and fulfillment resource 1060 can provide pre-arrangement for, and procurement of cloud computing resources for which a future requirement is anticipated in accordance with an SLA.

A workloads layer 1062 can provide functionality for which the cloud computing environment can be utilized. For example, workloads layer 1062 can include a mapping and navigation resource 1064, a software development and lifecycle management resource 1066, a virtual classroom education delivery resource 1068, a data analytics processing resource 1070, a transaction processing resource 1072, and image layer extraction 1074.

FIG. 11 illustrates a block diagram of an exemplary computing environment and computer system 1100 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 1100 therefore can embody a general-purpose computer. In another exemplary embodiment, the implementation can be part of a mobile device, such as, for example, a mobile phone, a personal data assistant (PDA), a tablet computer, etc.

As shown in FIG. 11, the computer 1100 includes processor 1101. Computer 1100 also includes memory 1102 communicatively coupled to processor 1101, and one or more input/output adapters 1103 that can be communicatively coupled via system bus 1105. Memory 1102 can be communicatively coupled to one or more internal or external memory devices via a storage interface 1108. Communications adapter 1116 can communicatively connect computer 1100 to one or more networks 1106. System bus 1105 can communicatively connect one or more user interfaces via input/output (I/O) adapter 1103. I/O adapter 1103 can connect a plurality of input devices 1104 to computer 1100. Input devices can include, for example, a keyboard, a mouse, a microphone, a sensor, etc. System bus 1105 can also communicatively connect one or more output devices 1107 via I/O adapter 1103. Output device 1107 can include, for example, a display, a speaker, a touchscreen, etc.

Processor 1101 is a hardware device for executing program instructions (aka software), stored in a computer-readable memory (e.g., memory 1102). Processor 1101 can be any custom made or commercially available processor, a central processing unit (CPU), a plurality of CPUs, for example, CPU 1101a-1101c, an auxiliary processor among several other processors associated with the computer 1100, a semiconductor based microprocessor (in the form of a microchip or chip set), or generally any device for executing instructions. Processor 1101 can include a cache memory 1122, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 1122 can be organized as a hierarchy of more cache levels (L1, L2, etc.).

Processor 1101 can be disposed in communication with one or more memory devices (e.g., RAM 1109, ROM 1110, one or more external databases 1121, etc.) via a storage interface 1108. Storage interface 1108 can also connect to one or more memory devices including, without limitation, one or more databases 1121, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 1102 can include random access memory (RAM) 1109 and read only memory (ROM) 1110. RAM 1109 can be any one or combination of volatile memory elements (e.g., DRAM, SRAM, SDRAM, etc.). ROM 1110 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 1102 can incorporate electronic, magnetic, optical, and/or other types of non-transitory computer-readable storage media. Memory 1102 can also be a distributed architecture, where various components are situated remote from one another, but can be accessed by processor 1101.

The instructions in memory 1102 can include one or more separate programs, each of which can include an ordered listing of computer-executable instructions for implementing logical functions. In the example of FIG. 11, the instructions in memory 1102 can include an operating system 1111. Operating system 1111 can control the execution of other computer programs and provides scheduling, input-output control, file and data management, memory management, and communication control and related services.

The program instructions stored in memory 1102 can further include application data 1112, and for a user interface 1113.

I/O adapter 1103 can be, for example but not limited to, one or more buses or other wired or wireless connections. I/O adapter 1103 can have additional elements (which are omitted for simplicity) such as controllers, microprocessors, buffers (caches), drivers, repeaters, and receivers, which can work in concert to enable communications. Further, I/O adapter 1103 can facilitate address, control, and/or data connections to enable appropriate communications among the aforementioned components.

I/O adapter 1103 can further include a display adapter coupled to one or more displays. I/O adapter 1103 can be configured to operatively connect one or more input/output (I/O) devices 1107 to computer 1100. For example, I/O 1103 can connect a keyboard and mouse, a touchscreen, a speaker, a haptic output device, or other output device. Output devices 1107 can include but are not limited to a printer, a scanner, and/or the like. Other output devices can also be included, although not shown. Finally, the I/O devices connectable to I/O adapter 1103 can further include devices that communicate both inputs and outputs, for instance but not limited to, a network interface card (MC) or modulator/demodulator (for accessing other files, devices, systems, or a network), a radio frequency (RF) or other transceiver, a telephonic interface, a bridge, a router, and the like.

According to some embodiments, computer 1100 can include a mobile communications adapter 1123. Mobile communications adapter 1123 can include GPS, cellular, mobile, and/or other communications protocols for wireless communication.

In some embodiments, computer 1100 can further include communications adapter 1116 for coupling to a network 1106.

Network 1106 can be an IP-based network for communication between computer 1100 and any external device. Network 1106 transmits and receives data between computer 1100 and devices and/or systems external to computer 1100. In an exemplary embodiment, network 1106 can be a managed IP network administered by a service provider. Network 1106 can be a network internal to an aircraft, such as, for example, an avionics network, etc. Network 1106 can be implemented in a wireless fashion, e.g., using wireless protocols and technologies, such as WiFi, WiMax, etc. Network 1106 can also be a wired network, e.g., an Ethernet network, an ARINC 429 network, a controller area network (CAN), etc., having any wired connectivity including, e.g., an RS232 connection, R5422 connection, etc. Network 1106 can also be a packet-switched network such as a local area network, wide area network, metropolitan area network, Internet network, or other similar type of network environment. The network 1106 can be a fixed wireless network, a wireless local area network (LAN), a wireless wide area network (WAN) a personal area network (PAN), a virtual private network (VPN), intranet or other suitable network system.

Network 1106 can operatively connect computer 1100 to one or more devices including device 1117, device 1118, and device 1120. Network 1106 can also connect computer 1100 to one or more servers such as, for example, server 1119.

If computer 1100 is a PC, workstation, laptop, tablet computer and/or the like, the instructions in the memory 1102 can further include a basic input output system (BIOS) (omitted for simplicity). The BIOS is a set of routines that initialize and test hardware at startup, start operating system 1111, and support the transfer of data among the operatively connected hardware devices. The BIOS is typically stored in ROM 1110 so that the BIOS can be executed when computer 1100 is activated. When computer 1100 is in operation, processor 1101 can be configured to execute instructions stored within the memory 1102, to communicate data to and from the memory 1102, and to generally control operations of the computer 1100 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for multi-level imaging and extraction on a host system comprising:
    saving, via a processor, a copy of a client computing environment to a computer memory on the host system; and
    writing, via the processor, based on the copy of the client computing environment, an image of the client computing environment, the image comprising an application layer, a middleware layer, and a system layer;
    wherein the image is extractable as a sub-image comprising one or more of the application layer, the middleware layer, and the system layer; and
    wherein the image comprises a resource pattern comprising dependencies associating two or more of the application layer, the middleware layer, and the system layer, such that the sub-image is selectively combinable with a combination comprising one of an existing active container operating on a second computing system, and an inactive container; and
wherein the combination results in a functional copy of the client computing system with changes extracted from the sub-image.

2. The computer-implemented method of claim 1, wherein the sub-image is extractable from the image by an extraction engine such that the sub-image is added to the existing active container operating on the second computing system; wherein the second computing system can emulate the client computing environment with the added sub-image.

3. The computer-implemented method of claim 2, wherein the image comprises:
a resource pattern that associates a plurality of resources on the client computing environment with one or more of a list comprising traces, program data, and application context data; and
a dependency table template based on the resource pattern, the dependency table template comprising dependency relationships between the application layer, the middleware layer, and the system layer.

4. The computer-implemented method of claim 1, wherein the application layer comprises information indicative of one or more applications running on the host system, data associated with the one or more applications, one or more web services, and one or more transactions.

5. The computer-implemented method of claim 1, wherein the middleware layer comprises application data, link data, and language environment data.

6. The computer-implemented method of claim 1, wherein the system layer comprises a base container as a service (CaaS) configured to run on a single control host and access a single kernel.

7. A computer-implemented method for multi-level imaging and extraction on a guest system comprising:
retrieving, via a processor, an image of a client computing environment, the image comprising an application layer, a middleware layer, and a system layer;
assigning, via the processor, an extraction level needed to extract one or more sub-images from the image of the client computing environment that can be incorporated with one of an active container on the guest system and an inactive container on the guest system;
collecting, via the processor, a plurality of resources associated with the assigned extraction level;
defining a plurality of resource dependencies for the application layer, the middleware layer, and the system layer, wherein the resource dependencies identify an operational relationship between the plurality of resources and one or more of the application layer, the middleware layer, and the system layer;
generating, via the processor, an image and build file based on the extraction level and the plurality of dependencies;
extracting, via the processor executing the image and build file, the one or more sub-images from the image of the client computing environment; and
incorporating, via the processor, the one or more sub-images with the active container on the guest system.

8. The computer-implemented method of claim 7, wherein assigning the extraction level comprises:
identifying, via the processor, a container status indicative of whether the active container;
determining, via the processor, a change status indicative of whether one or more of the application layer, the middleware layer, and the system layer are different from a respective corresponding layer on the guest system; and
assigning, via the processor, the extraction level based on the container status indicative that the active container is active, and the change status indicative of one or more changes in the image compared with the guest system.

9. The computer-implemented method of claim 8, further comprising:
setting, via the processor, a container instance name and a container instance time period associated with the extraction level.

10. The computer-implemented method of claim 7, wherein the application layer comprises information indicative of one or more applications running on the guest system, data associated with the one or more applications, one or more web services, and one or more transactions.

11. The computer-implemented method of claim 7, wherein the middleware layer comprises application data, link data, and language environment data.

12. The computer-implemented method of claim 7, wherein the system layer comprises a base Container as a Service (CaaS) configured to run on a single control host and access a single kernel.

13. The computer-implemented method of claim 7, wherein defining a plurality of resource dependencies comprises:
filtering the resource list using a pattern decision tree;
retrieving, using the filtered resource list, a dependency table template from a resource pattern repository;
determining, via the processor, an actual dependency of a plurality of resources running on the guest system, and instantiating the dependency template into a dependency table based on the actual dependency;
forming, via the processor, a plurality of definitions and statuses for the dependencies; and
building, via the processor, the plurality of resource dependencies based on the plurality of definitions and statuses.

14. A system for multi-level imaging and extraction comprising:
a processor on a guest system configured to:
retrieve an image of a client computing environment, the image comprising an application layer, a middleware layer, and a system layer;
assign an extraction level needed to extract one or more sub-images from the image of the client computing environment that can be incorporated with an active container on the guest system;
collect a plurality of resources associated with the assigned extraction level;
define a plurality of resource dependencies for the application layer, the middleware layer, and the system layer, wherein the resource dependencies identify an operational relationship between the plurality of resources and one or more of the application layer, the middleware layer, and the system layer;
generate an image and build file based on the extraction level and the plurality of dependencies;
extract the one or more sub-images from the image of the client computing environment; and
incorporate the one or more sub-images with the active container on the guest system.

15. The system of claim 14, wherein the processor is further configured to:
- identify a container status of the active container;
- determine a change status indicative of whether one or more of the application layer, the middleware layer, and the system layer are different from a respective corresponding layer on the guest system; and
- assign the extraction level based on the container status indicative that the active container is active, and the change status indicative of one or more changes in the image compared with the guest system.

16. The system of claim 15, wherein the processor is further configured to:
- set a container instance name and a container instance time period associated with the extraction level.

17. The system of claim 14, wherein the application layer comprises information indicative of one or more applications running on the guest system, data associated with the one or more applications, one or more web services, and one or more transactions.

18. The system of claim 14, wherein:
- the middleware layer comprises application data, link data, and language environment data; and
- the system layer comprises a base Container as a Service (CaaS) configured to run on a single control host and access a single kernel.

19. The system of claim 14, wherein the processor is further configured to:
- filter a resource list using a pattern decision tree;
- retrieve the filtered resource list, a dependency table template from a resource pattern repository;
- determine an actual dependency of a plurality of resources running on the guest system, and instantiating the dependency template into a dependency table based on the actual dependency;
- form a plurality of definitions and statuses for the dependencies; and
- build the plurality of resource dependencies based on the plurality of definitions and statuses.

* * * * *